May 21, 1929.   J. B. CALLAHAN   1,713,739
MEANS AND METHOD OF EXTERMINATING WATER HYACINTH
Filed March 27, 1922    4 Sheets-Sheet 2
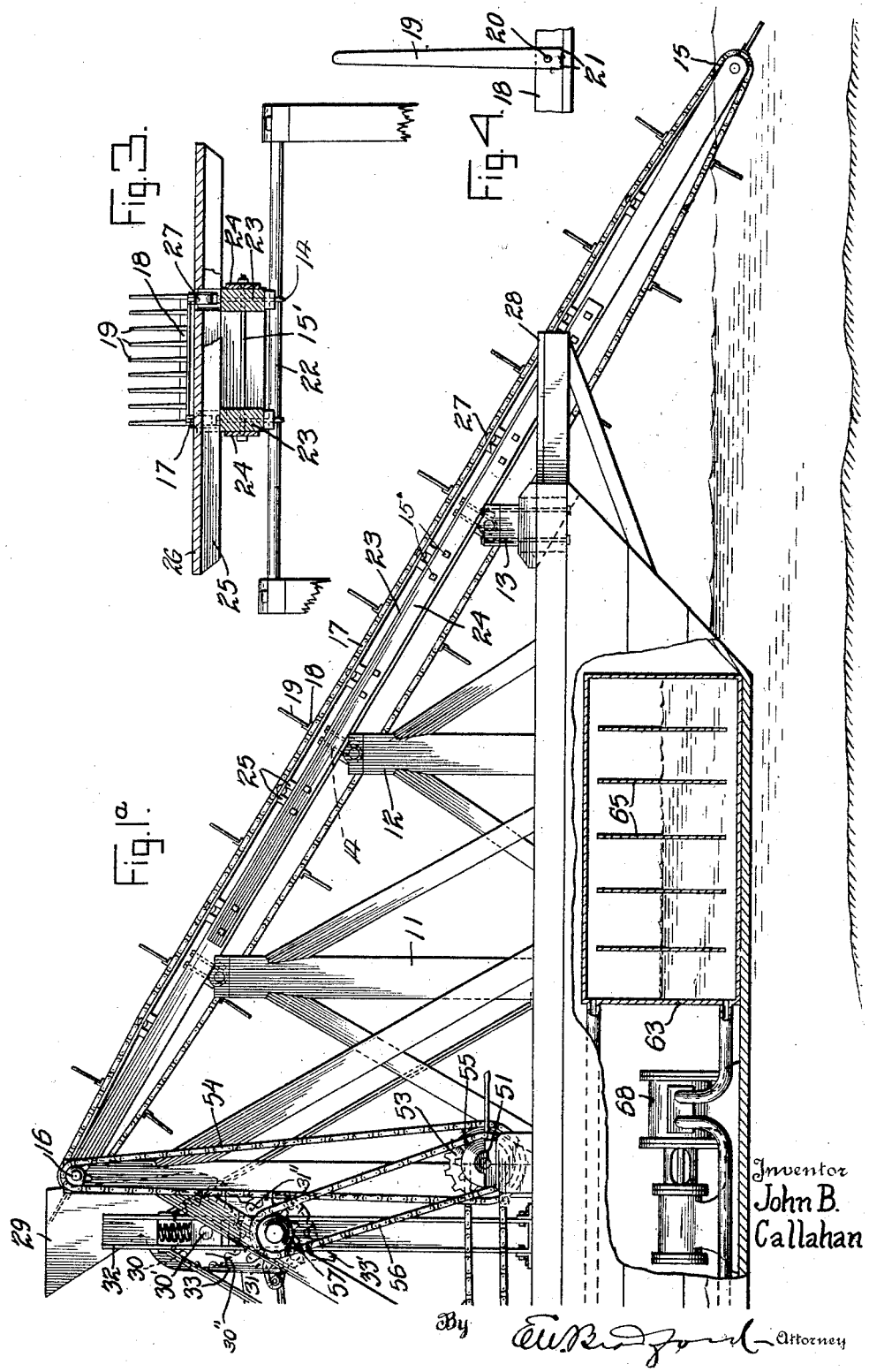
Inventor
John B. Callahan

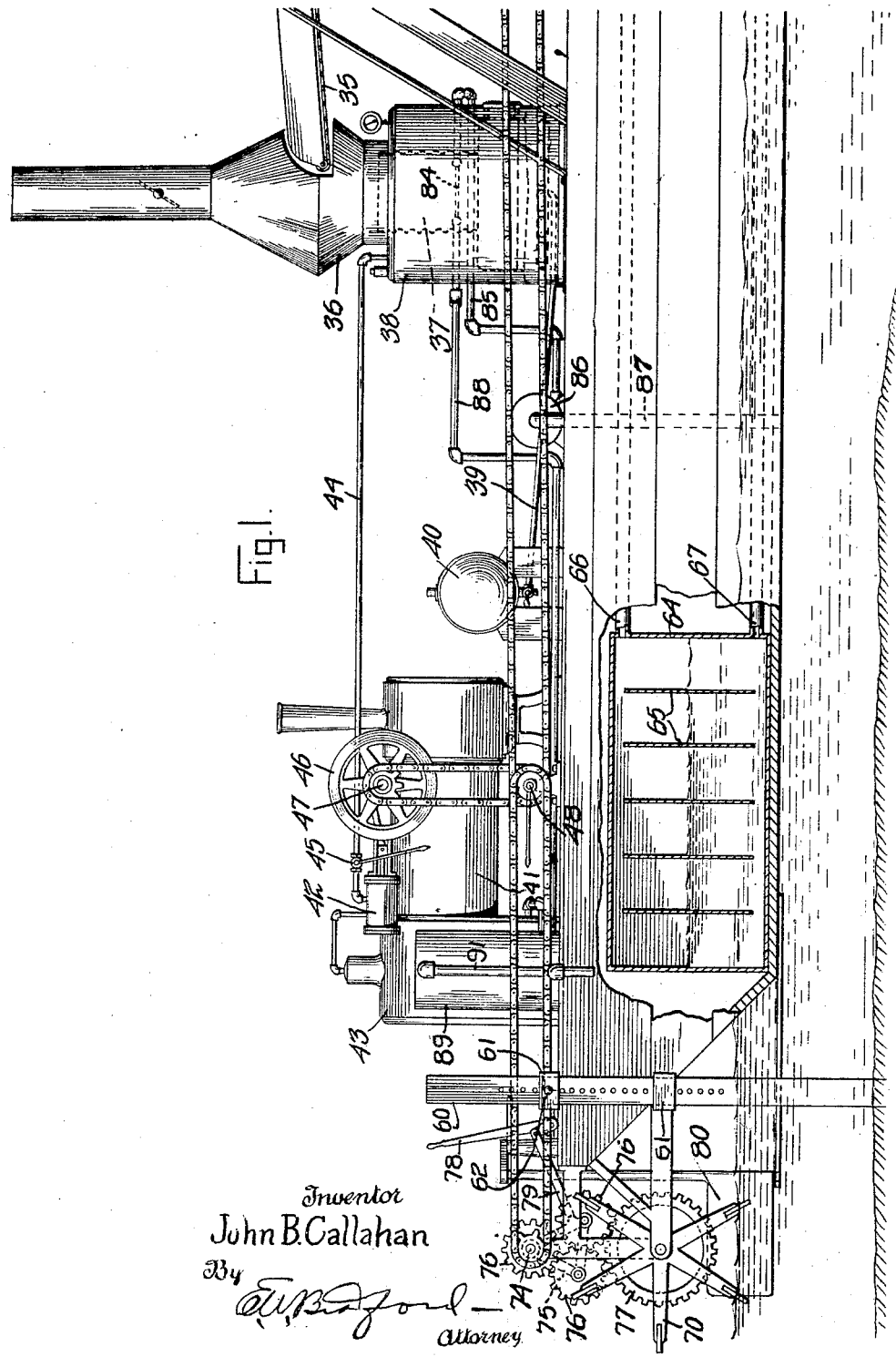

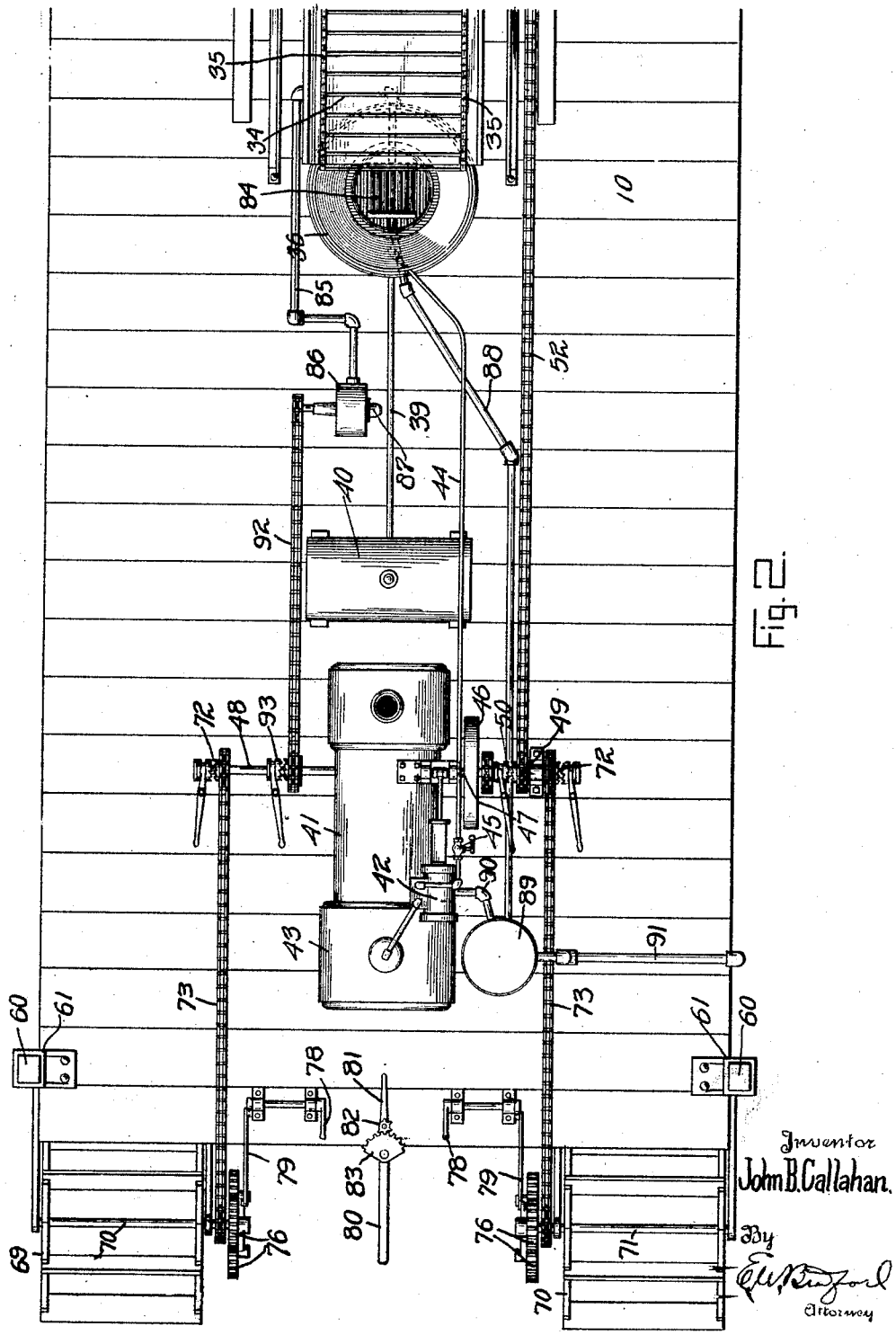

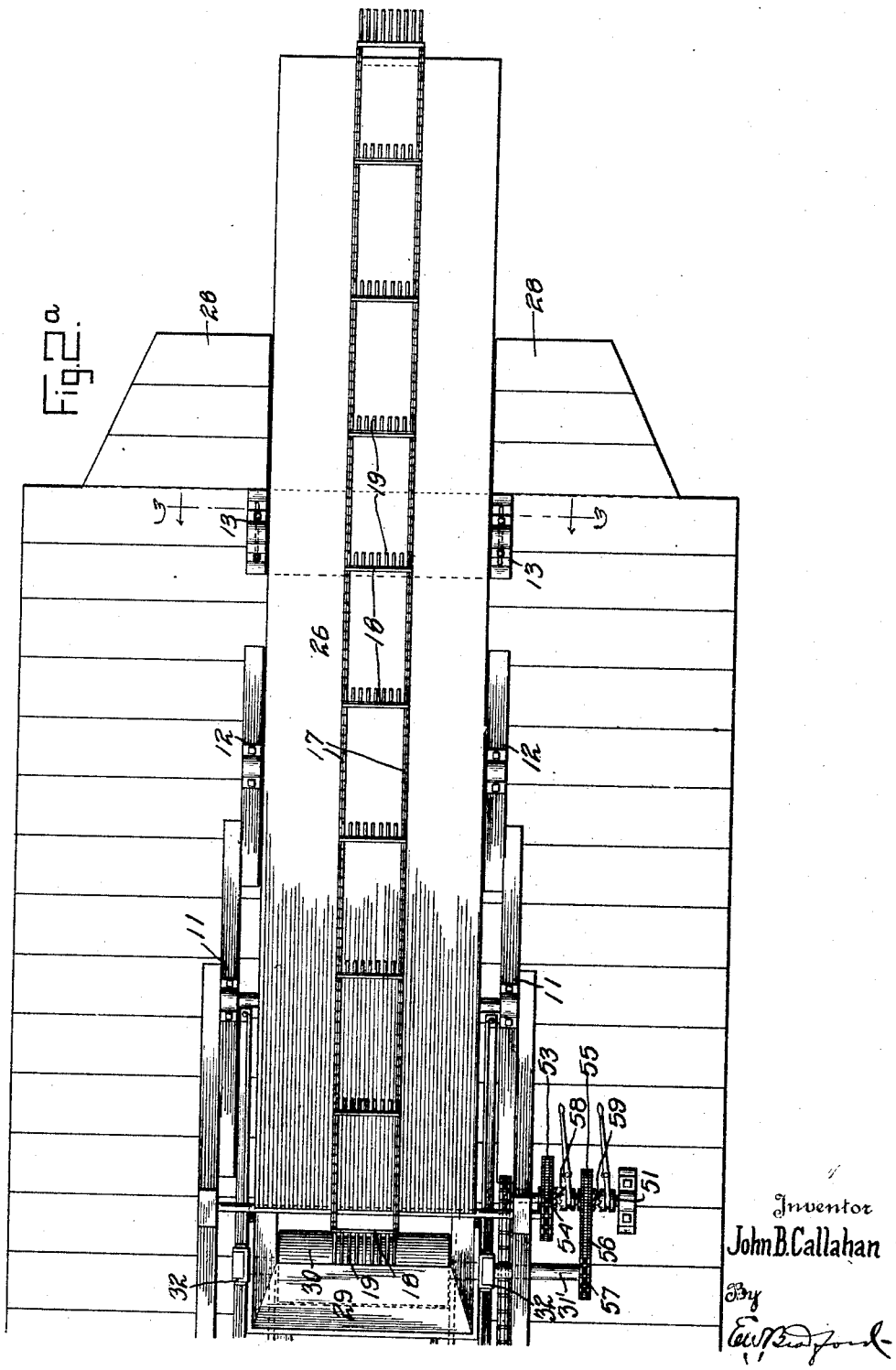

Patented May 21, 1929.

1,713,739

UNITED STATES PATENT OFFICE.

JOHN B. CALLAHAN, OF JACKSONVILLE, FLORIDA.

MEANS AND METHOD OF EXTERMINATING WATER HYACINTH.

Application filed March 27, 1922. Serial No. 547,099.

My said invention relates to a machine for removing water hyacinth from rivers and canals and for entirely destroying the plants so removed and to a method which is conveniently practiced by the use of said machine, but is not limited thereto. In some parts of the South especially, these plants are found in rivers and canals and they frequently interfere very materially with navigation as the plants form a continuous mass across the channel and for long distances up and down the same. Any device which removes merely the tops of the plants would be entirely insufficient to clear the channel. Various attempts have been made to cut such growths to pieces without removing the plant in the hope that the severed parts would float away or decay but these also have proved ineffective as the growth quickly restores itself and becomes worse than before. By the use of my invention the plants are pulled up root and branch and utterly destroyed.

It is a further object of my invention to utilize the solid matter from the plants as a means to produce steam to run the machine.

Another object, among various minor purposes is to provide a means adapted to give way on encountering a log or snag or the like thus avoiding serious damage to the entire mechanism.

Referring to the accompanying drawings which are made a part hereof and on which similar reference characters indicate similar parts, Figures 1 and 1ª taken together constitute a vertical elevation of a scow fitted up with the mechanism constituting my invention, parts being broken away to show devices in the body of the scow.

Figures 2 and 2ª taken together show the scow in plan with my device located thereon.

Figure 3 is a section of a conveyor and supporting means therefor taken on line 3—3 of Figure 2ª, and Figure 4 is a detail of a conveyor tooth.

In the drawings 10 indicates a scow or other boat of convenient size and shape for supporting the various mechanisms constituting my invention. On the deck of the scow are a series of standards or pairs of standards 11, 12 and 13 carrying conveyor supporting beams having at their ends appropriate rollers 15 and 16 about which is trained a conveyor 17. The standards 11 and 12 are rigid, while standard 13 is loosely mounted to provide a "spring" or floating bearing for the conveyor. At intervals along the length of the conveyor are fastened L-shaped cross bars 18 of angle iron on which are mounted cast iron teeth 19 each of which is attached to the upper flange of its bar by a single rivet 20. The teeth have downwardly projecting points 21 (Figure 4) engaging the lower flange of the bar 18 and forming with the rivet a three point bearing on the bar.

Each of the standards 11, 12 and 13 carries a cross bar 22 (Figure 3) on which are supported the side members 23. At each cross bar 22, U-shaped bolts 14 are provided to secure the side members 23 in place on the cross bar. These members are connected by bolts 15′ preferably arranged in pairs as shown in Figure 1ª and the bolts may all pass through bars of iron or steel 24 extending along and re-enforcing the members 23.

Above each pair of bolts is a pair of transversely extending bars 25 resting on the supporting members 23. These transverse bars carry a sloping floor 26 of planks or the like underneath the upper run of the conveyor. Between each pair of transverse members and above the respective side members 23 are rollers 27 having outer flanges for supporting and guiding the conveyor. The front of the scow is cut away below the lower run of the conveyor to provide room for the teeth 19 and the scow is built out at the forward end as indicated at 28 to provide a platform at each side of the conveyor on which the lookout may stand to watch for logs or other objects brought up by the conveyor and to remove them therefrom. The teeth of the conveyor are made of cast iron so that they may break on encountering an object too large and heavy to be raised by the conveyor, it being desirable to break the teeth rather than other parts of the mechanism.

At the rear end of the elevating conveyor is a hopper 29 for receiving the water hyacinth from the same and below the hopper is a pair of heavy rollers 30 and 31 having at their ends meshing gears 30″ and 31″, these gears being formed with teeth of unusual length so that a considerable mass of weeds may pass between the rollers (or such objects as branches of trees or the like) without permanently disturbing the engagement of the teeth. The upper roller is carried by a shaft 30' engaging bearings slidable up and down in brackets 32, the bearings being held down by springs in ordinary manner. The lower roller is carried by a shaft 31' in fixed bearings on said brackets.

The material passes from the hopper to the rollers which crush the water and sap out of the plants, the water flowing down on the deck of the scow or being carried off in any convenient manner. A housing is here shown to direct the liquid down to a spout 33' which may lead to pipes extending over the side, if desired. From the rollers the partially dehydrated material passes to a conveyor having transverse bars 34 connected to a pair of side chains 35 formed as sprocket chains and passing over sprocket gears which receive their power from the same shaft that supports the roller 31.

The crushed material is carried by the conveyor to an incinerator 36 having a central fire space at 37 and a water space surrounding the same at 38 in which steam is generated which may be used for running the entire device. The second conveyor moves very slowly and permits the material carried thereby to become heated by the smoke and gases rising from the fire. For this purpose a hood or other conduit may be arranged to carry the smoke along the conveyor if desired, the preliminary heating and drying making the material more readily combustible. The incinerator may be of any type suited to the burning of wet material such as bagasse or garbage. A pipe 39 conveys gasoline or other liquid fuel from a tank 40 to the fire space. This fuel serves to start the fire and if necessary may be used throughout the operation to keep up the fire.

At the rear end of the scow is an engine 41 of ordinary type having a cylinder 42 adapted to be operated by steam from a boiler 43 or by steam brought through pipe 44 from the water jacket of the incinerator. This pipe has a throttle valve 45 adapted to be opened and closed by hand.

The steam cylinder 42 is connected in an ordinary manner to a fly wheel 46 on a shaft 47 and this shaft is connected by sprocket gearing to a shaft 48. A sprocket gear 49 journaled on the latter shaft is adapted to be connected thereto by a manually operated clutch member 50 splined on the shaft. Sprocket 49 is connected to a sprocket on a shaft 51 by a chain 52. This shaft has a second sprocket 53 connected by a chain 54 to a sprocket driving the conveyor 17. A third sprocket 55 on the same shaft drives the shaft 31' by means of a chain 56 passing over a sprocket 57. Sprocket 53 is adapted to be connected to shaft 51 by means of a manually operated clutch member 58 and sprocket 55 is similarly adapted to be connected to the shaft by means of a manually operated clutch member 59.

In operation the scow will be floated to some convenient location in a river or canal that is to be cleared of hyacinth and will be fastened in place by means of posts 60 here shown as passing through eyes 61 attached to the scow. These posts may vary in number according to the exigencies of the situation and may be omitted entirely if it is convenient to tie to objects on the bank. When used they are forced into the bottom by any convenient means which may be the weight of the scow. This weight may be caused to act on the posts by means of pins 62 passing through holes in the posts and the eyes 61. A fire being started in the main engine the power may be applied through the driving mechanism hereinbefore described to start the conveyor, the teeth of which dip into the water to engage the mass of vegetation and take it up the inclined way 26. To counterbalance the increased weight at the front end of the scow due to the vegetation being carried up the conveyor and also that due to the pressure on the conveyor itself I provide means in the body of the scow comprising tanks 63 and 64 provided with baffles 65 in ordinary manner and connected by an upper air pipe 66 to equalize the air pressure and a lower pipe 67 through which water may be pumped from either tank to the other by means of any convenient pump indicated generally at 68. Water will be pumped from one tank to the other until the deck is level or at any desired slant.

Various ways of propelling my device in moving it from one place to another will occur to those skilled in the art but I have shown as a preferred means a pair of paddle wheels 69 and 70 at the rear of the scow. These paddle wheels are mounted on shafts 70 and 71 located in bearings projected from the scow and are driven from shaft 48 by a train of gearing comprising a clutch 72 at each end of the shaft and sprocket chains 73 passing over sprockets on the shaft 48 and a stub shaft 74 respectively. The stub shaft 74 carries a triangular bracket 75 having a gear 76 at each corner and the lower pair of gears are adapted to mesh alternately with a gear 77 on the paddle wheel shaft for driving it either forward or back. In this way the scow may be driven forward or back or may be turned by driving one paddle wheel in one direction and the other in the opposite direction. A hand lever 78 is connected by a link 79 to the bracket 75 for swinging the same to change the direction of drive. A rudder 80 is located between the paddle wheels and is operated by a tiller 81 fixed to a pinion 82 meshing with a segment rack 83 on the rudder post.

For economy of fuel when the boiler 43 is used I may provide a grate 84 in the incinerator, this grate comprising a series of parallel pipes connected at one end to a supply pipe 85 leading from a pump 86 and the pump having a supply pipe 87 extending down into the water. At the other end the grate is connected to a pipe 88 leading into a hot-well 89 connected by a pipe 90 to the boiler. An overflow pipe 91 leads from the hot-well out over the side of the scow. For driving the pump 86 I provide a sprocket gear 92 and a clutch 93 adapted to connect the same to the shaft 48. It will be seen that the grate 84 is spaced at some distance from the bottom of the incinerator. The purpose of this is to cause the vegetation which is to be burned to hang up on the grate and be partially dried and crisped by the fire beneath it. As is is dried out and partially burned the material will drop from the grate 84 to the bottom of the incinerator where it will help keep up the hot part of the fire. This grate prevents choking of the fire by affording a preliminary stage of heating and drying after which the material will be in better shape for burning.

In the operation of the device the engineer will look after the main engine and the supplementary steam generator i. e. the incinerator, while a lookout will be stationed at the front of the scow to remove logs and other objects being carried up by the conveyor and to give notice of any undue happenings as; e. g. the breakage of conveyor teeth by encountering a snag or a log. In case of danger the conveyor may be instantly stopped by operating the clutch member 58 or both the conveyor and the crushing rolls may be stopped by manipulating both clutch members 58 and 59.

The mechanism hereinbefore described may be varied as to details of parts and arrangement thereof as will be obvious to those skilled in the art and such modifications may extend to the entire device as well as to particular parts thereof, therefore I do not limit myself to the specific devices shown in the drawings and described in the specification but only as set forth in the appended claims. Neither do I limit myself to the specific purpose set forth, as the device or parts thereof may be found useful for other specific purposes. The method may also be practiced by the use of various mechanisms, which may be variously arranged on boats or scows or even on the banks of a stream or canal as by the use of portable devices drawn by a tractor.

Having thus fully described my said invention, what I claim as new and desire to secure by Letters Patent, is:

1. In a device for exterminating water hyacinth, a floating support, an incinerator carried thereby, crushing rolls adjacent the incinerator, means for conveying plants from the water level to the crushing rolls and thence to the incinerator and means for transferring fluid from one end of the support to the other end to serve as ballast to counterbalance the tipping effect produced by the weight of the plants, substantially as set forth.

2. In a device for exterminating water hyacinth, a floating support, crushing rolls carried thereby, means for conveying plants from the water to the crushing rolls, posts adapted to be secured to the corners of the support, and means whereby the support may be inclined alternately from end to end to drive the posts into the ground beneath said support, substantially as set forth.

3. In a device for exterminating water hyacinth, a floating support, crushing rolls carried thereby, means for conveying plants from the water level to the crushing rolls, a steam engine for driving said parts, an incinerator for receiving crushed material, said incinerator having fluid containing means therethrough whereby it serves as a boiler for supplying additional steam to the engine for driving the rolls and conveying means, substantially as set forth.

4. A device of the character described comprising a floating support, a steam engine thereon, crushing means carried by the support, means for lifting the material from the water to the crushing means, an incinerator for the crushed material, said incinerator adapted to act as an auxiliary steam boiler, and connections whereby either of said engines may drive said crushing means and said conveying means, substantially as set forth.

5. A device for treating water plants comprising a floating vessel, an incinerator thereon, means for collecting the plants and delivering them to the incinerator, driving means for said collecting and delivering means and means located within the incinerator to provide steam for operating said driving means, substantially as set forth.

6. A device for treating water plants comprising a floating vessel, an incinerator thereon, means for collecting the plants and delivering them to the incinerator, steam operated driving means for said collecting and delivering means, and means in connection with said incinerator for supplying steam to said driving means, substantially as set forth.

7. A device for treating water plants comprising a floating vessel, an incinerator thereon, means for collecting the vegetation and delivering it to the incinerator, steam operated driving means for said collecting and delivering means, means in connection with said incinerator for supplying steam to said driving means, a boiler also adapted to supply steam to said driving means, a hot well connected to said boiler and means operated by said incinerator to heat water for the hot well, substantially as set forth.

8. A device for treating water plants comprising a floating vessel, an incinerator thereon, means for collecting the vegetation and delivering it to the incinerator, steam operated driving means for said collecting and delivering means, means in connection with said incinerator for supplying steam to said driving means, a boiler also adapted to supply steam to said driving means, a hot well connected to said boiler and a grate extending transversely of the incinerator and spaced from the bottom thereof, said grate including water pipes to heat water for the hot well, substantially as set forth.

In witness whereof, I have hereunto set my hand at Washington, District of Columbia, this third day of March, A. D. nineteen hundred and twenty-two.

JOHN B. CALLAHAN.